United States Patent
Akkarakaran et al.

(10) Patent No.: US 11,576,134 B2
(45) Date of Patent: Feb. 7, 2023

(54) METHODS AND APPARATUS TO FACILITATE A SOFT IN-COVERAGE/OUT-OF-COVERAGE INDICATION FOR SIDELINK COMMUNICATIONS

(71) Applicant: QUALCOMM Incorporated, San Diego, CA (US)

(72) Inventors: Sony Akkarakaran, Poway, CA (US); Tao Luo, San Diego, CA (US); Junyi Li, Chester, NJ (US); Jung Ho Ryu, Fort Lee, NJ (US); Kapil Gulati, Hillsborough, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 16/909,384

(22) Filed: Jun. 23, 2020

(65) Prior Publication Data

US 2021/0014814 A1    Jan. 14, 2021

Related U.S. Application Data

(60) Provisional application No. 62/872,682, filed on Jul. 10, 2019.

(51) Int. Cl.
*H04W 56/00* (2009.01)
*H04W 76/14* (2018.01)
(Continued)

(52) U.S. Cl.
CPC ...... *H04W 56/0015* (2013.01); *H04B 7/0626* (2013.01); *H04L 5/0048* (2013.01); *H04W 24/10* (2013.01); *H04W 76/14* (2018.02)

(58) Field of Classification Search
CPC . H04W 56/0015; H04W 24/10; H04W 76/14; H04W 56/0025; H04B 7/0626; H04B 7/0408; H04L 5/0048
See application file for complete search history.

(56) References Cited

U.S. PATENT DOCUMENTS

2018/0132202 A1* 5/2018 Kalhan ............. H04W 56/0025
2018/0287866 A1* 10/2018 Yoon .................. H04L 41/0806
2019/0037530 A1* 1/2019 Han ..................... H04B 7/0617

FOREIGN PATENT DOCUMENTS

EP        1715656 A1    10/2006
EP        3288314 A1 *   2/2018 ............ H04W 40/12
(Continued)

OTHER PUBLICATIONS

International Search Report and Written Opinion—PCT/US2020/039425—ISA/EPO—dated Sep. 25, 2020.

*Primary Examiner* — Ayanah S George
(74) *Attorney, Agent, or Firm* — Procopio, Cory, Hargreaves & Savitch LLP

(57) ABSTRACT

Apparatus, methods, and computer-readable media for facilitating a soft in-coverage/out-of-coverage indication for sidelink communications are disclosed herein. An example method for wireless communication at a wireless device includes determining a coverage state with reference to a cell for a timing reference. In some examples, the coverage state may be determined from among a set of states including an in-coverage state, an out-of-coverage state, and at least one additional coverage state. The example method also includes broadcasting a state indicator based on the coverage state determined by the wireless device.

29 Claims, 10 Drawing Sheets

(51) Int. Cl.
*H04B 7/06* (2006.01)
*H04W 24/10* (2009.01)
*H04L 5/00* (2006.01)

(56) References Cited

FOREIGN PATENT DOCUMENTS

| | | | |
|---|---|---|---|
| EP | 3288314 | A1 | 2/2018 |
| EP | 3499785 | A1 | 6/2019 |
| WO | 2015143170 | A1 | 9/2015 |

\* cited by examiner

METHODS AND APPARATUS TO FACILITATE A SOFT IN-COVERAGE/OUT-OF-COVERAGE INDICATION FOR SIDELINK COMMUNICATIONS

CROSS-REFERENCE TO RELATED APPLICATION(S)

This application claims the benefit of U.S. Provisional Patent Application Ser. No. 62/872,682, entitled "Methods And Apparatus To Facilitate A Soft In-Coverage/Out-Of-Coverage Indication For Sidelink Communications," and filed on Jul. 10, 2019, which is expressly incorporated by reference herein in its entirety.

BACKGROUND

Technical Field

The present disclosure relates generally to communication systems, and more particularly, to wireless communication based on sidelink.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as based on sidelink. There exists a need for further improvements in sidelink communication technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Sidelink synchronization facilitates providing timing reference for sidelink communication, including the transmitting of sidelink messages and/or the receiving of sidelink messages. A sidelink device may be an in-coverage (IC) device or may be an out-of-coverage (OOC) device. Generally, an IC device may attempt to acquire synchronization signals (SS) of the serving cell (e.g., while operating in a connected mode) or the cell the IC device is camping on (e.g., while operating in an idle mode) for any sidelink signals. In some examples, an OOC device may attempt to derive timing reference information from sidelink SS (SLSS) transmitted by another device. In some examples, the other device may be an IC device, in which case the timing reference information may be derived from that device, and thus, indirectly, from the network (e.g., the serving cell or the cell the IC device is camping on). In some other examples, the other device may also be an OOC device, in which case the timing reference information may be derived from other SLSS and/or may have selected autonomously (e.g., by the other device).

Selecting an SLSS as a timing reference for sidelink transmissions may be referred to as selecting a synchronization reference UE (or a "SyncRef UE"). Sidelink SS may be used as timing reference for sidelink reception by IC devices and/or OOC devices. An SLSS may include a sidelink primary synchronization signal (SL-PSS) and a sidelink secondary synchronization signal (SL-SSS). In some examples, the SL-PSS and/or the SL-SSS may correspond to a sidelink identity (SLI).

In some examples, a device (e.g., a receiving UE) may receive one or more SLSS from corresponding devices. In some such examples, the receiving device may prioritize a timing reference for a device that is in-coverage to a timing reference for a device that is out-of-coverage. In some examples, the receiving device may determine that a timing reference for a device is in-coverage based on an indication present in the corresponding received SLSS.

Example techniques disclosed herein facilitate providing a set of coverage states associated with a device. In some examples, the set of coverage states may include a fully in-coverage state, a fully out-of-coverage state, and at least one additional coverage state, such as a partially in-coverage state. In some examples, the device may select the corresponding coverage state based on or more metrics associated with, for example, a power measurement, a quantity of visible beams, and/or a beam diversity metric.

In some examples, disclosed techniques facilitate partitioning SLIs based on the quantity of coverage states included in the set of coverage states. For example, in the above example in which the set of coverage states includes three coverage states, an SLI may be partitioned into three groups in which the lower third of the SLI may correspond to the fully in-coverage state, the upper third of the SLI may correspond to the fully out-of-coverage state, and the middle third of the SLI may correspond to the partially in-coverage state. However, it may be appreciated that other techniques for partitioning the SLIs based on the quantity of coverage states may additionally or alternatively be used.

In an aspect of the disclosure, a method, a computer-readable medium, and an apparatus for wireless communication at a wireless device are provided. An example apparatus determines a coverage state with reference to a cell for a timing reference. In some examples, the coverage state may be determined from among a set of states including an in-coverage state, an out-of-coverage state, and at least one additional coverage state. The example apparatus also broadcasts a state indicator based on the coverage state determined by the wireless device.

In another aspect of the disclosure, a method, a computer-readable medium, and an apparatus for wireless communication at a first wireless device are provided. An example apparatus receives a timing reference signal from a second wireless device, the timing reference signal having a state indicator indicating a coverage state for the second wireless device. In some examples, the coverage state may be selected from among a set of states including an in-coverage state, an out-of-coverage state, and at least one additional coverage state. The example apparatus also determines whether to use the timing reference signal from the second wireless device as a synchronization source for the first wireless device. In some examples, the determination may be based on whether the coverage state associated with the timing reference signal from the second wireless device is the in-coverage state, the out-of-coverage state, or the at least one additional coverage state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
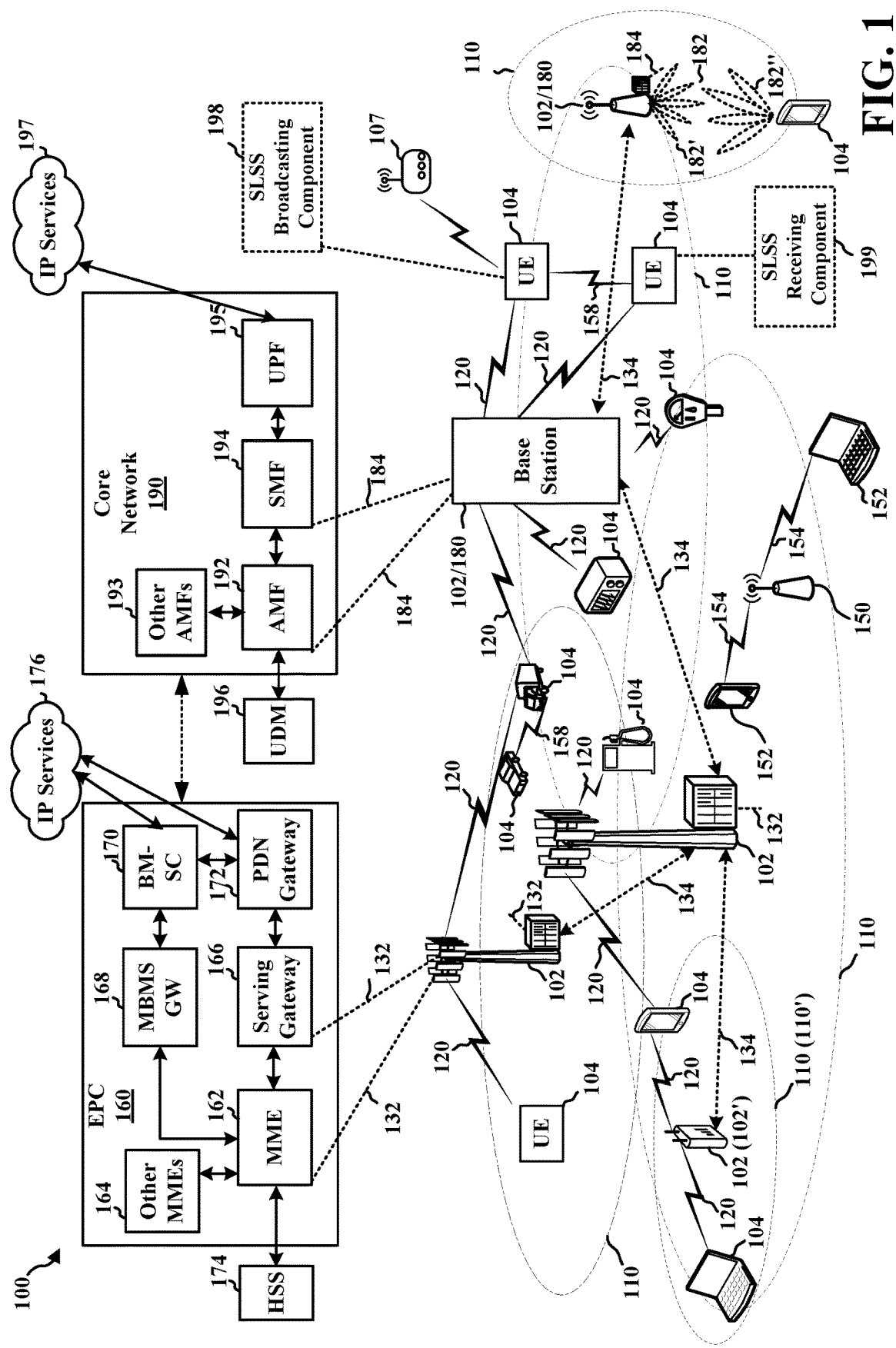
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. Some wireless communication may be exchanged directly between wireless devices based on sidelink. The communication may be based on vehicle-to-anything (V2X) or other device-to-device (D2D) communication, such as Proximity Services (ProSe), etc. Sidelink communication may be exchanged based on a PC5 interface, for example.

Example techniques disclosed herein facilitate providing a set of coverage states associated with a device. In some examples, the set of coverage states may include a fully in-coverage state, a fully out-of-coverage state, and at least one additional coverage state, such as a partially in-coverage state. In some examples, the device may select the corresponding coverage state based on or more metrics associated with, for example, a power measurement, a quantity of visible beams, and/or a beam diversity metric.

In some examples, a broadcasting device, such as a UE 104, may be configured to manage one or more aspects of wireless communication via a soft IC/OOC indication for sidelink communications. As an example, in FIG. 1, the UE 104 may include an SLSS broadcasting component 198 configured to determine a coverage state with reference to a cell for a timing reference. In some examples, the coverage state may be determined from among a set of states including an in-coverage state, an out-of-coverage state, and at least one additional coverage state. The example SLSS broadcasting component 198 may also be configured to broadcast a state indicator based on the coverage state determined by the UE.

In some examples a receiving device, such as the UE 104, may be configured to manage one or more aspects of wireless communication via a soft IC/OOC indication for sidelink communication. As an example, in FIG. 1, the UE 104 may include an SLSS receiving component 199 configured to receive a timing reference signal from a broadcasting UE, the timing reference signal having a state indicator indicating a coverage state for the broadcasting UE. In some examples, the coverage state may be selected from among a set of states including an in-coverage state, an out-of-coverage state, and at least one additional coverage state. The example SLSS receiving component 199 may also be configured to determine whether to use the timing reference signal from the broadcasting UE as a synchronization source for the receiving UE. In some examples, the determination may be based on whether the coverage state associated with the timing reference signal from the broadcasting UE is the in-coverage state, the out-of-coverage state, or the at least one additional coverage state.

Although the following description may provide examples of a soft IC/OOC indication for sidelink communications, the concepts described herein are similarly applicable to other similar areas, such as establishing an access link connection (e.g., between a UE and a base station). Furthermore, although the following description may provide examples directed to 5G NR, the concepts described herein may be applicable to other similar areas, such as LTE, LTE-A, CDMA, GSM, and other wireless technologies in which a device may provide a timing reference signal for sidelink connections.

Some examples of sidelink communication may include vehicle-based communication such as vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as V2X communications. As an example, in FIG. 1, a UE 104, e.g., a transmitting Vehicle User Equipment (VUE) or other UE 104, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
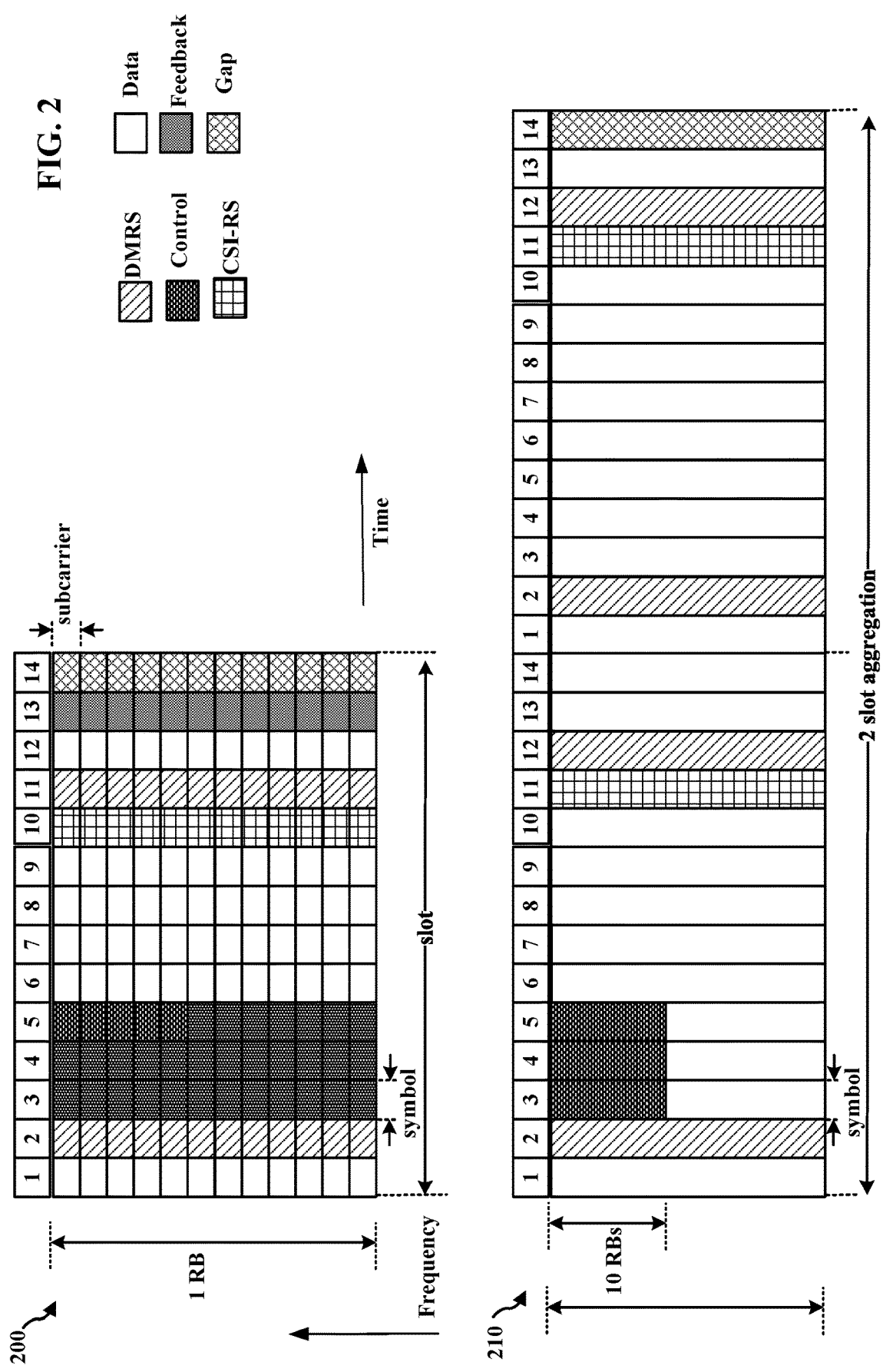
FIG. 2 illustrates example aspects of a sidelink slot structure.

FIG. 2 illustrates example diagrams 200 and 210 illustrating non-limiting examples of time and frequency resources that may be used for wireless communication based on sidelink. In some examples, the time and frequency resources may be based on a slot structure. In other examples, a different structure may be used. The slot structure may be within a 5G/NR frame structure in some examples. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on control information triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
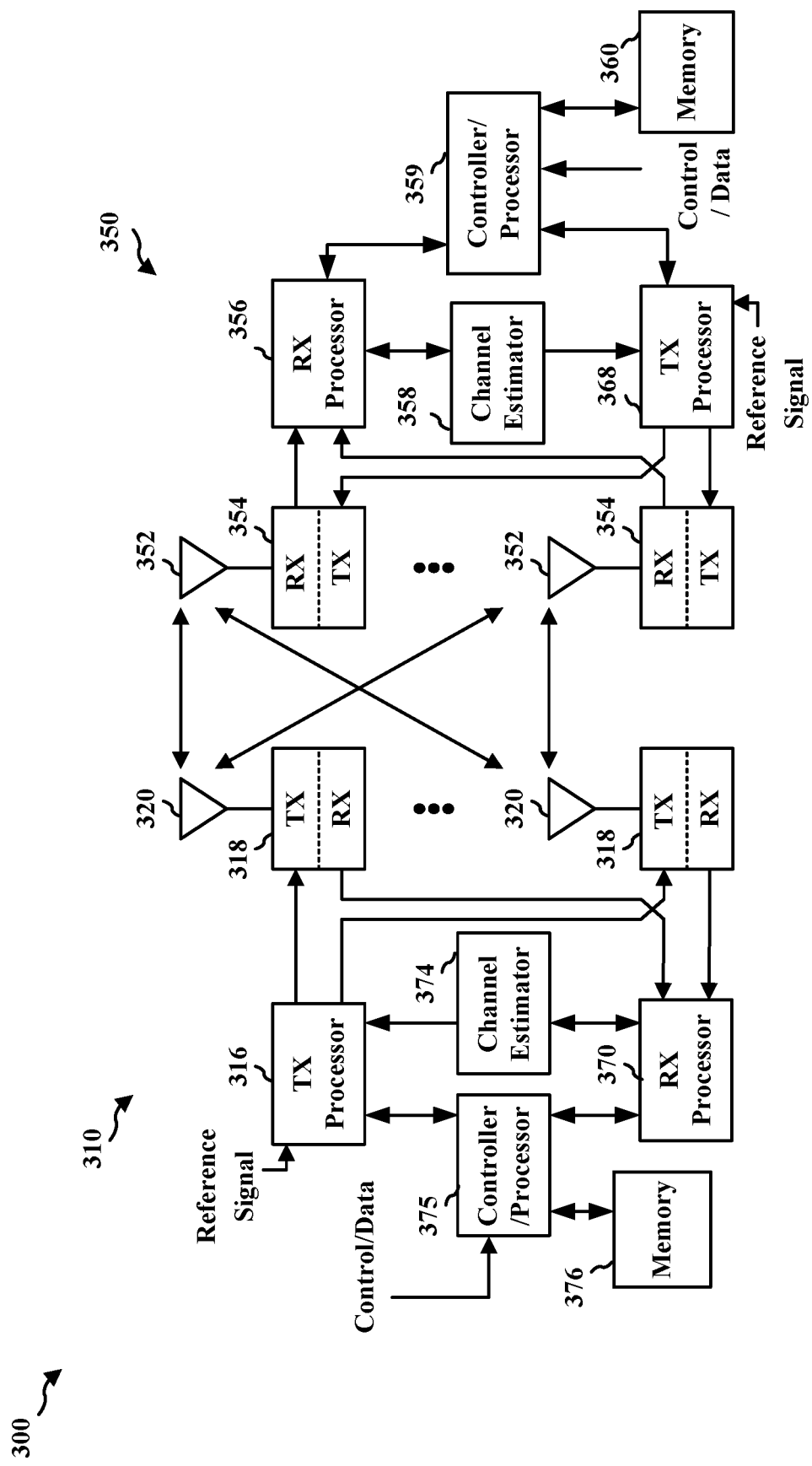
FIG. 3 is a diagram illustrating an example of a first device and a second device involved in sidelink communication.

FIG. 3 is a block diagram 300 of a first wireless communication device 310 in communication with a second wireless communication device 350. The communication may be based on sidelink, e.g., using a PC5 interface. In some examples, the devices 310 and 350 may communicate based on V2X or other D2D communication. The devices 310 and the 350 may comprise a UE, an RSU, a base station, etc. In some examples, the device 310 may be a UE and the device 350 may be a UE. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX processor 316, the RX processor 370, or the controller/processor 375 may be configured to perform aspects described in connection with the SLSS broadcasting component 198 and/or the SLSS receiving component 199 of FIG. 1.

Figure 4:
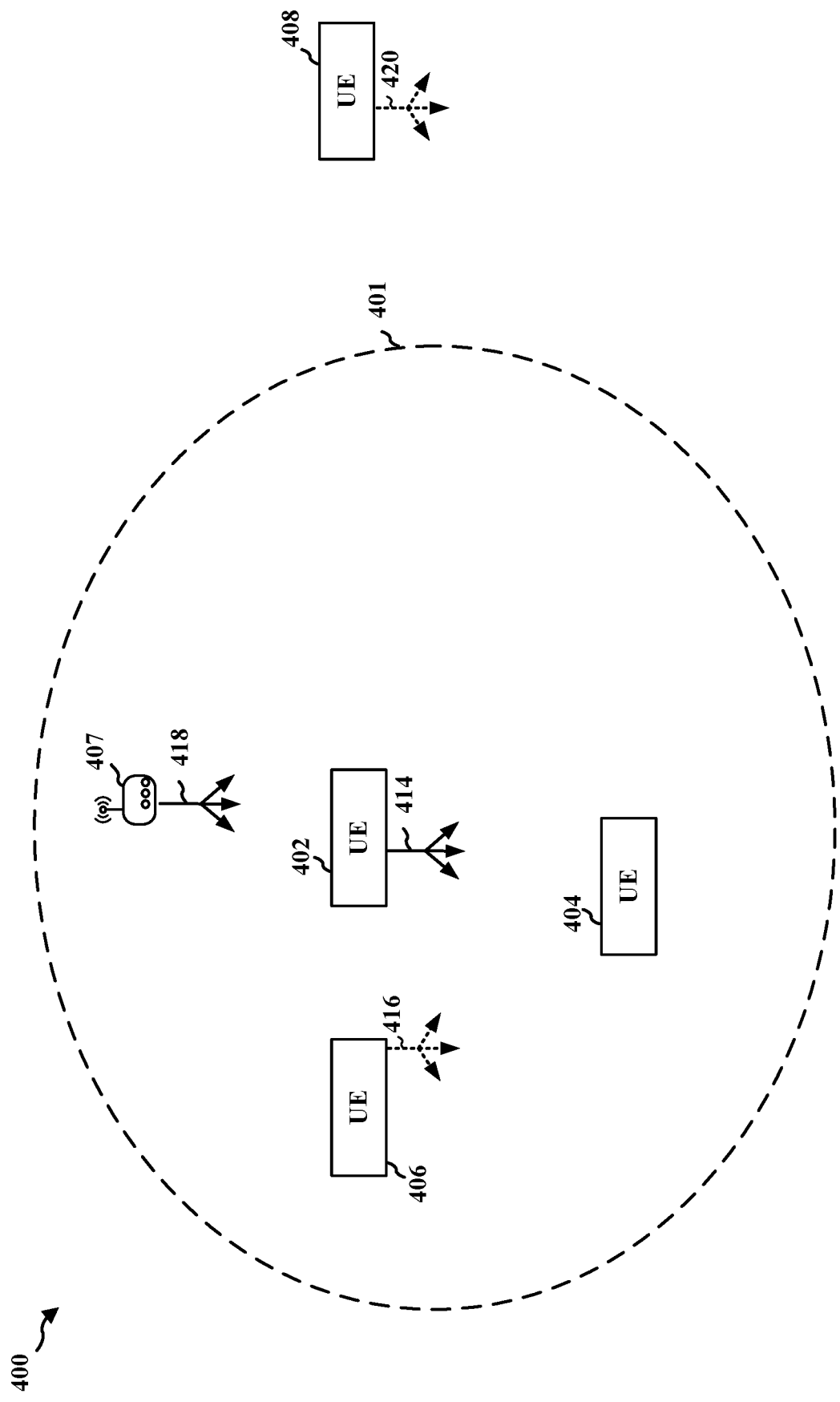
FIG. 4 illustrates an example of sidelink communication between wireless devices, in accordance with one or more of the teachings disclosed herein.

FIG. 4 illustrates an example 400 of sidelink communication between wireless devices. The communication may be based on a slot structure comprising aspects described in connection with FIG. 2 or another sidelink structure. Although the example in FIG. 4 is described for the UEs 402, 404, 406, 408, aspects may be applied to other wireless devices configured for communication based on sidelink, such as an RSU, an IAB node, etc. As illustrated in FIG. 4, a transmitting UE 402 may transmit a transmission 414 comprising a control information (e.g., sidelink control information (SCI)) and/or a corresponding data channel, that may be received by receiving UEs 404, 406, 408. The SCI may include information for decoding the corresponding data and may also be used by receiving device to avoid interference by refraining from transmitting on the occupied resources during a data transmission. For example, the SCI may reserve resources for sidelink communication. The number of TTIs, as well as the RBs that will be occupied by the data transmission, may be indicated in SCI from the transmitting device. The UEs 402, 404, 406, 408 may each be capable of operating as a transmitting device in addition to operating as a receiving device. Thus, the UEs 406, 408 are illustrated as transmitting transmissions 416 and 420. The transmissions 414, 416 or 420 may be broadcast or multicast to nearby devices. For example, the UE 402 may transmit communication intended for receipt by other UEs within a range 401 of the UE 402. In other examples, the transmissions 414, 416, or 418 may be groupcast to nearby devices that a member of a group. In other examples, the transmissions 414, 416, or 420 may be unicast from one UE to another UE. Additionally or alternatively, the RSU 407 may receive communication from and/or transmit communication 418 to the UEs 402, 404, 406, 408.

The UE 402, 404, 406, 408 and/or the RSU 407 may comprise an SLSS broadcasting component, similar to the SLSS broadcasting component 198 described in connection with FIG. 1. The UE 402, 404, 406, 408 and/or the RSU 407 may additionally or alternatively comprise an SLSS receiving component, similar to the SLSS receiving component 199 described in connection with FIG. 1.

Sidelink synchronization facilitates providing timing reference for sidelink communication, including the transmitting of sidelink messages and/or the receiving of sidelink messages. A sidelink device may be an IC device or may be an OOC device. Generally, an IC device may attempt to acquire synchronization signals of the serving cell (e.g., while operating in a connected mode) or the cell that the IC device is camping on (e.g., while operating in an idle mode) for use as timing reference for sidelink signals that the IC device may transmit. In some examples, an OOC device may attempt to derive timing reference information from SLSS transmitted by another device. In some examples, the other device may be an IC device, in which case the timing reference information may be effectively or indirectly derived from the network (e.g., the serving cell or the cell that the IC device is camping on). In some examples, the other device may be an OOC device, in which case the timing reference information may be derived from other SLSS and/or may have selected autonomously (e.g., by the other device).

Selecting an SLSS as a timing reference for sidelink transmissions may be referred to as selecting a synchronization reference UE (or a "SyncRef UE"). However, the term "SyncRef UE" refers to the received SLSS rather than to a device. For example, within a cluster of OOC devices, one or more OOC devices may transmit the same SLSS. In some such examples, an OOC device using that same SLSS as the timing reference is not synchronizing with a particular device, but may be synchronizing to the combined SLSS associated with the one or more OOC devices.

Sidelink SS may be used as timing reference for sidelink reception by IC devices and/or OOC devices. Sidelink SS may include a sidelink primary synchronization signal (SL-PSS), a sidelink secondary synchronization signal (SL-SSS), and a sidelink broadcast channel (SL-BCH or SL-PBCH). In some examples, the SL-PSS and/or the SL-SSS may correspond to an SLI.

In some examples, a sidelink device may obtain its timing reference from an IC device or an OOC device. In some examples, an OOC device may obtain its timing reference from an IC device, an OOC device, or may autonomously determine its timing (e.g., when no timing reference is available).

Figure 5:
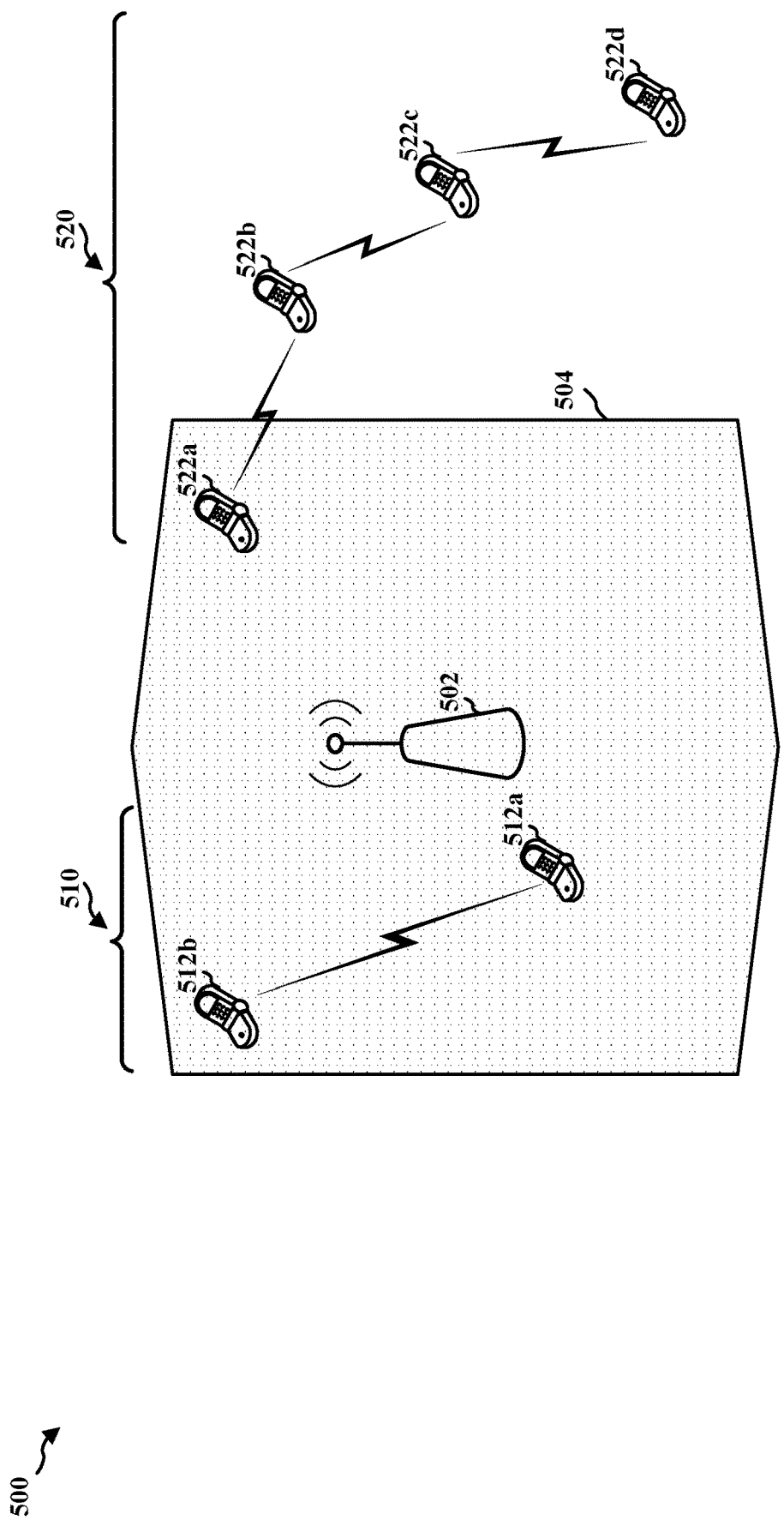
FIG. 5 depicts an example illustration of a base station serving a cell, a first sidelink chain including UEs, and a second sidelink chain including UEs, in accordance with the teachings disclosed herein.

FIG. 5 depicts an example illustration 500 of a base station 502 serving a cell 504, a first sidelink chain 510 including UEs 512, and a second sidelink chain 520 including UEs 522. Aspects of the base station 502 may be implemented by the base station 102/180 of FIG. 1. Aspects of the UEs 512, 522 may be implemented by the UE 104 of FIG. 1, the devices 310, 350 of FIG. 3, the UEs 402, 404, 406, 408 of FIG. 4, and/or the RSU 407 of FIG. 4.

In the illustrated example of FIG. 5, the first sidelink chain 510 includes a first UE 512a in sidelink communication with a second UE 512b. The example first UE 512a and the second UE 512b are in-coverage devices with respect to the cell 504.

In the illustrated example of FIG. 5, the second sidelink chain 520 includes a first UE 522 in sidelink communication with a second UE 522b, which is in sidelink communication with a third UE 522c, which is in sidelink communication with a fourth UE 522d. The example first UE 522a is an in-coverage device with respect to the cell 504 and the remaining UEs 522b, 522c, 522d of the second sidelink chain 520 are out-of-coverage devices with respect to the cell 504.

In some examples, a device (e.g., a receiving UE) may receive one or more SLSS from corresponding devices. In some such examples, the receiving device may prioritize a timing reference for a device that is in-coverage to a timing reference for a device that is out-of-coverage. In some examples, the receiving device may determine that a timing reference for a device is in-coverage based on a measurement of the corresponding received SLSS. For example, the receiving device may compare a signal strength of the received SLSS to a threshold and determine that the corresponding device is in-coverage when the signal strength satisfies the threshold (e.g., the signal strength is greater than (or equal to) the threshold).

For example, referring to FIG. 5, the in-coverage UEs 512a, 512b, 522a may prioritize timing references from the base station 502 to timing references from other UEs and/or base stations.

However, if the receiving device is unable to select a timing reference for an IC device, the receiving device may prioritize a timing reference for an OOC device that obtained its timing reference from an IC device (e.g., an OOC device with an IC SyncRef UE). Furthermore, if the receiving device is unable to select a timing reference for an OOC device with an IC SyncRef UE, the receiving device may select any timing reference (e.g., based on any available OOC device, or based on GNSS timing, etc.) or may autonomously select its timing if no timing reference is available.

For example, referring to FIG. 5, the first OOC UE 522b of the second sidelink chain 520 may receive a first SLSS from the IC UE 522a and a second SLSS from the second OOC UE 522c of the second sidelink chain 522. In the illustrated example, the first OOC UE 522b may prioritize the first SLSS from the IC UE 522a to the second SLSS from the second OOC UE 522c as the timing reference for the IC UE 522a is for an in-coverage device.

Thus, it may be appreciated that selecting a timing reference that corresponds to a device that is in-coverage (e.g., the UEs 512a, 512b, 522a) may be preferred to selecting a timing reference that corresponds to a device that is out-of-coverage (e.g., the UEs 522b, 522c, 522d). Furthermore, when a timing reference from an IC device is not available, it may be appreciated that selecting a timing reference that corresponds to a device that is out-of-coverage but is associated with an in-coverage SyncRef UE (e.g., the UE 522b) may be preferred.

Furthermore, it may be appreciated that in some examples, an in-coverage device may receive an SLSS from the cell, but the coverage may not be robust. As used herein, the term "robust" may refer to a relatively weak signal strength (e.g., a relatively weak reference signal received power (RSRP)) or a relatively small quantity of beams (e.g., the UE may receive one beam).

Example techniques disclosed herein facilitate providing a set of coverage states associated with a device. In some examples, the set of coverage states may include a fully in-coverage state, a fully out-of-coverage state, and at least one additional coverage state, such as a partially in-coverage state. In some examples, the device may select the corresponding coverage state based on or more metrics associated with, for example, a power measurement, a quantity of visible beams, and/or a beam diversity metric.

In some examples, disclosed techniques facilitate partitioning an SLI based on the quantity of coverage states included in the set of coverage states. For example, in the above example in which the set of coverage states includes three coverage states, an SLI may be partitioned into three groups in which the lower third of the SLI may correspond to the fully in-coverage state, the upper third of the SLI may correspond to the fully out-of-coverage state, and the middle third of the SLI may correspond to the partially in-coverage state. However, it may be appreciated that other techniques for partitioning the SLI based on the quantity of coverage states may additionally or alternatively be used.

Example techniques disclosed herein facilitate a broadcasting device to broadcast a state identifier and an SLI. In some examples, the state identifier may correspond to the selected coverage state of the broadcasting device. In some examples, the SLI may correspond to the coverage state for the SyncRef UE of the broadcasting device.

For example, referring to the illustrated example of FIG. 5, the IC UE 522a of the second sidelink chain 520 may determine that its coverage state is the partially in-coverage state. In such examples, the IC UE 522a may broadcast a state indicator corresponding to the partially in-coverage state and an SLI corresponding to the partially in-coverage group of SLIs (e.g., the middle third of SLIs).

Similarly, the first OOC UE 522b of the second sidelink chain 520 may determine that its coverage state is the out-of-coverage state. In such examples, the first OOC UE 522b may broadcast a state indicator corresponding to the out-of-coverage state and an SLI corresponding to the partially in-coverage group of SLIs (e.g., the middle third of SLIs) as the SyncRef UE of the first OOC UE 522*b* is the IC UE 522*a*.

Figure 6:
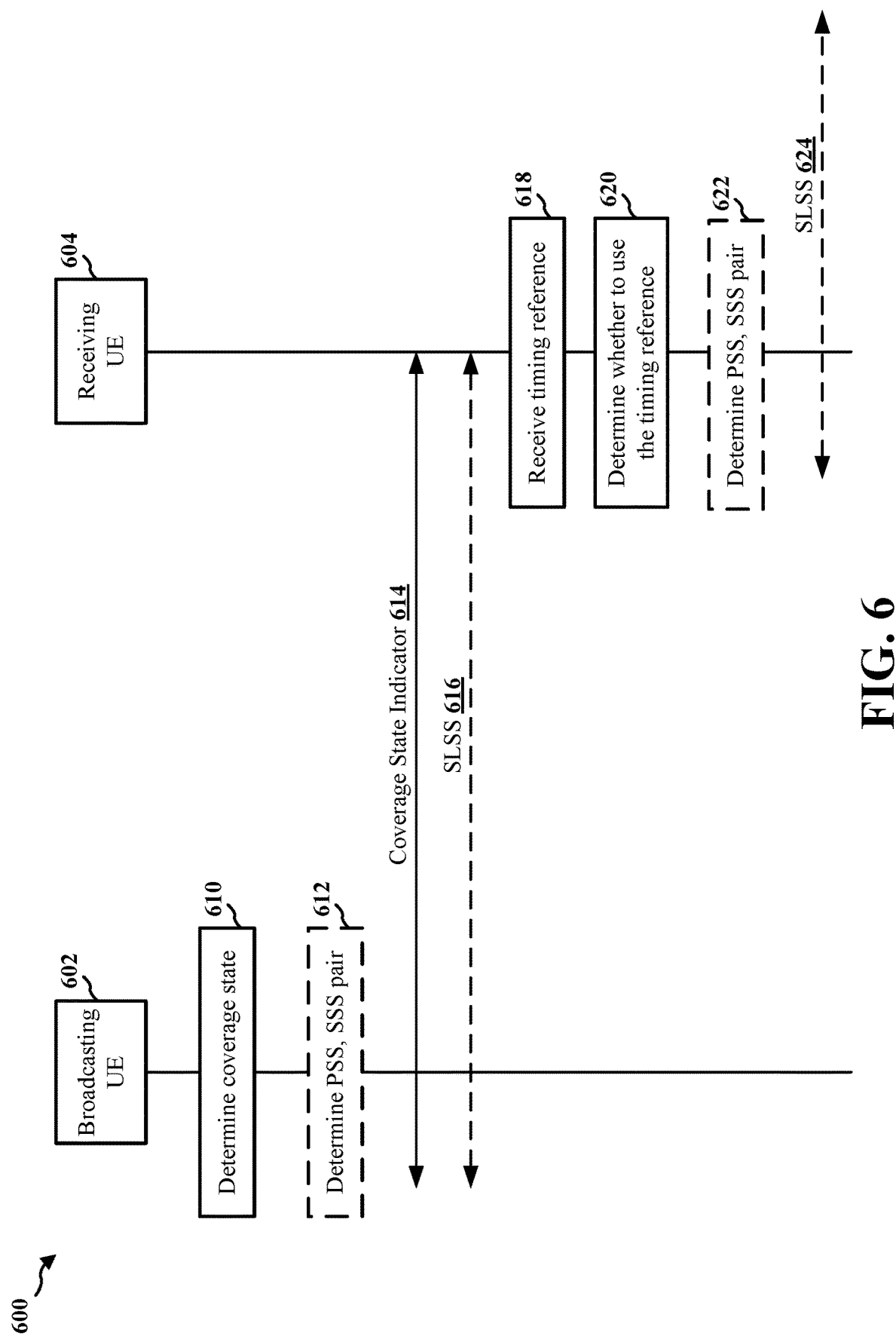
FIG. 6 illustrates an example communication flow between a first device and a second device, in accordance with the teachings disclosed herein.

FIG. 6 illustrates an example communication flow 600 between a first wireless device (e.g., a broadcasting UE 602) and a second wireless device (e.g., a receiving UE 604). The communication may be based on sidelink. In some examples, the communication may be based on V2X or D2D communication that is exchanged directly between the first wireless device (e.g., the broadcasting UE 602) and the second wireless device (e.g., the receiving UE 604). In the illustrated example of FIG. 6, the first wireless device and the second wireless device are UEs.

In the illustrated wireless communication flow 600, the broadcasting UE 602 and the receiving UE 604 may be establishing a timing reference for sidelink communications. In the illustrated example of FIG. 6, the broadcasting UE 602 is a UE that broadcasts transmissions that may be received by other UEs, such as the receiving UE 604. However, it may be appreciated that in additional or alternate examples, the broadcasting UE 602 may receive broadcast transmissions and/or the receiving UE 604 may broadcast transmissions.

Aspects of the UEs 602, 604 may be implemented by the UE 104, 402, 404, 406, 408, the device 310 or 350, and/or the RSU 107, 407. Although not shown in the illustrated example of FIG. 6, it may be appreciated that in additional or alternate examples, the broadcasting UE 802 and/or the receiving UE 804 may be in communication with one or more other wireless devices and/or base stations.

Although the wireless communication flow 600 may include the broadcasting UE 602 and the receiving UE 604 establishing a timing reference for sidelink communications, in additional or alternate examples, the broadcasting UE 602 and/or the receiving UE 604 may be in communication with any suitable quantity of UEs and/or base stations. While the transmissions included in the wireless communication 600 may appear to be transmissions from the broadcasting UE 602 to the receiving UE 604, in additional or alternate examples, the transmissions transmitted by the broadcasting UE 602 may be broadcast transmissions that are received by the receiving UE 604 and any suitable quantity of additional UEs and/or base stations. Furthermore, the receiving UE 604 may be receiving transmissions broadcast by the broadcasting UE 602 and any suitable quantity of additional UEs and/or base stations. For example, the communications transmitting from the UEs 602, 604 may be broadcast and received by multiple receiving devices within range of a particular transmitting device, as described in connection with FIG. 4.

At 610, the broadcasting UE 602 determines a coverage state. For example, the broadcasting UE 602 may select a coverage state from a set of coverage states.

At 612, the broadcasting UE 602 may determine a PSS, SSS pair. For example, the broadcasting UE 602 may determine an SL-PSS and SL-SSS pair including an SLI based on the determined coverage state. In some examples, the SLI may be carried in (or indicated by) the determined SL-SSS, or the determined SL-PSS and SL-SSS pair.

In the illustrated example, the broadcasting UE 602 broadcasts a coverage state indicator 614 that is received by the receiving UE 604. In some examples, the coverage state indicator 614 may correspond to the coverage state determined by the broadcasting UE 602. The broadcasting UE 602 may also broadcast an SLSS 616 that is received by the receiving UE 604. In some examples, the SLSS 616 may include the PSS determined by the broadcasting UE 602 and include the SLI based on the determined coverage state (e.g., as determined at 612). Although the coverage state indicator 614 and the SLSS 616 are illustrated as separate broadcasts in the illustrated example of FIG. 6, in other examples, the coverage state indicator 614 and the SLSS 616 may be broadcast in one message. For example, the coverage state indicator 614 may be included with the SL-BCH channel, which may be mapped to the SL-PBCH (or PSBCH) physical channel, which may be a part of the SLSS 616.

At 618, the receiving UE 604 may receive a timing reference. For example, the receiving UE 604 may receive the SLSS 616 and acquire the timing reference from the SLSS 616.

At 620, the receiving UE 604 may determine whether to use the received timing reference. For example, the receiving UE 604 may determine whether to select the timing reference associated with the SLSS 616 as a synchronization source.

In some examples, the receiving UE 604 may determine, at 622, a PSS, SSS pair. For example, the receiving UE 604 may determine an SL-PSS and SL-SSS pair including an SLI. In some examples, the SLI may be carried in (or indicated by) the determined SL-SSS, or the determined SL-PSS and SL-SSS pair.

In some examples, the receiving UE 604 may broadcast an SLSS 624. In some examples, the SLSS 624 may indicate a coverage state of the receiving UE 604 (e.g., as determined by the broadcasting UE 602 at 610). In some examples, the SLSS 624 may also include an SLI (e.g., as deterred by the receiving UE 604 at 622).

In some examples, the broadcasting UE 602 may determine, at 610, the coverage state based on one or more metrics. For example, the broadcasting UE 602 may select the coverage state from a set of coverage states based on one or more of a power measurement, a quantity of visible beams, and/or beam diversity metrics.

In some examples, the broadcasting UE 602 may determine, at 610, the coverage state based on at least a power measurement associated with an SS and/or a CSI-RS received from a cell. In some examples, the broadcasting UE 602 may measure an RSRP of the SS and/or the CSI-RS received from the cell. For example, referring to FIG. 5, the IC UEs 512*a*, 512*b*, 522*a* may measure an RSRP of the SS and/or the CSI-RS received from the base station 502. The broadcasting UE 602 may compare the power measurement to one or more thresholds to determine a coverage state for the broadcasting UE 602. For example, if the set of coverage states includes three coverage states, the broadcasting UE 602 may select the fully in-coverage state when the power measurement is greater than (or equal to) a first threshold, may select the fully out-of-coverage state when the power measurement is less than (or equal to) a second threshold, and may select the partially in-coverage state when the power measurement is between the first threshold and the second threshold.

It may be appreciated that other examples may utilize additional or alternate techniques for determining a power measurement associated with an SS and/or a CSI-RS.

In some examples, the broadcasting UE 602 may determine, at 610, the coverage state based on at least a number of visible beams for the cell. In some examples, a beam may be determined to be visible based on a power measurement (e.g., RSRP) of the beam compared to a threshold(s). In some examples, the threshold(s) used for determining whether a beam is visible may be the same as the thresholds used for determining the coverage state based on the power measurement. In some examples, the threshold(s) used for determining whether a beam is visible may be different than the thresholds used for determining the coverage state based on the power measurement.

In some examples, the broadcasting UE 602 may determine that a beam is visible based on a frequency of beam failure per beam and/or when all beams fail. In some examples, a beam may fail due to beam blockage. In some examples, beam failure may refer to instances when two or more beams fail. In some examples, if a beam fails a threshold number of times, the beam may be determined to be not visible. For example, a first beam may fail and be replaced by a second beam, which may fail and subsequently be replaced by the first beam. In some such examples, the broadcasting UE 602 may count the number of times each of the beams fails to determine whether the beam is visible.

In some examples, the broadcasting UE 602 may apply one or more thresholds to determine whether the beam is visible and/or to determine a level of visibility associated with the beam. For example, the broadcasting UE 602 may compare the number of times a beam fails to a beam visibility threshold. In some such examples, if the broadcasting UE 602 determines that the number of times the beam fails is less than (or equal to) the beam visibility threshold, the broadcasting UE 602 may determine that the beam is visible. If the broadcasting UE 602 determines that the number of times the beam fails is greater than (or equal to) the beam visibility threshold, the broadcasting UE 602 may determine that the beam is not visible.

In some examples, the broadcasting UE 602 may compare the number of times a beam fails to two or more beam visibility thresholds to associate the beam with relatively more granular visibility levels. For example, a beam may be "very visible" when the number of times the beam fails is less than (or equal to) a first beam visibility threshold, may be "not visible" when the number of times the beam fails is greater than (or equal to) a second beam visibility threshold, and may be "partially visible" when the number of times the beam fails is between the first beam visibility threshold and the second beam visibility threshold.

In some examples, the broadcasting UE 602 may determine, at 610, the coverage state based on at least a number of visible cells. For example, the broadcasting UE 602 may determine the number of cells that the broadcasting UE 602 is able to connect with and compare the determined number to one or more cell visibility thresholds. In some such examples, the one or more cell visibility thresholds may correspond to two or more cell visibility levels.

In some examples, the broadcasting UE 602 may determine, at 610, the coverage state based on at least a beam diversity metric for a set of beams. In some such examples, the set of beams may include beams on which at least one of an SS and/or a CSI-RS was received. In some examples, the beam diversity metric may include one or more of a beam width, a beam direction, and whether beams are overlapping. Thus, the beam diversity metric may be used to determine whether the beams are sufficiently different.

For example, it may be beneficial to determine that two beams are sufficiently different so that if one beam is blocked, then it is unlikely that the other beam will also be blocked. For example, the broadcasting UE 602 may determine the boresight (or the beam direction associated with peak-gain) and prioritize beams having relatively different boresights and relatively non-overlapping beam main-lobes.

In some examples, the broadcasting UE 602 may obtain one or more beam diversity metrics (and/or related metrics) via a base station almanac. In some examples, the base station almanac may provide the broadcasting UE 602 location information related to the base station. In some examples, the base station almanac may include beam-shape information. In some examples, the base station almanac may be located and/or accessible to the broadcasting UE 602 via a base station. In some examples, the base station almanac may be accessible via a location server, for example, an eSMLC (enhanced Serving Mobile Location Center) or Location Measurement Function (LMF). In some examples, the broadcasting UE 602 may have the base station location information from a UE-based positioning session, from reading SIBs, and/or from unicast RRC messages received from the serving base station.

In some examples, the coverage state indicator 614 may be sorted (or ranked) from a fully in-coverage state to a fully out-of-coverage state. In some examples, a number N of coverage states may be a power of two to avoid wasted states. For example, if the number N of coverage states is three coverage states, then two bits may be used to indicate the coverage state and a fourth state may not correspond to a coverage state (e.g., is a wasted state). In some such examples (e.g., when the number N of coverage states is not a power of two), the additional state(s) may be used to indicate error event(s).

In some examples, the number N of coverage states may provide interim groups between a fully in-coverage state and a fully out-of-coverage state. For example, a third coverage state may indicate a partially in-coverage state. Referring to the example of FIG. 5, the first IC UE 512*a* may determine its coverage state (based on one or more metrics) to be a fully in-coverage state (e.g., a coverage state indicator set to "0"), the remaining IC UEs 512*b*, 522*a* may determine their coverage state (based on one or more metrics) to be a partially in-coverage state (e.g., a coverage state indicator set to "1"), and the OOC UEs 522*b*, 522*c*, 522*d* may determine their coverage state (based on one or more metrics) to be a fully out-of-coverage state (e.g., a coverage state indicator set to "2"). In the illustrated example, the partial in-coverage state may correspond to an interim group.

It may be appreciated that one or more tie-breaking techniques based on the one or more metrics to determine the coverage states may be used to resolve ties within the same coverage state.

In some examples, the broadcasting UE 602 may determine, at 612, the PSS based on SLI partitioning. For example, the SLIs may be partitioned into 2*(N−1) groups, where N represents the number of coverage states. For example, if there are two coverage states (e.g., an in-coverage state and an out-of-coverage state), the SLIs may be partitioned into a lower half for devices associated with an IC SyncRef UE (e.g., by being an in-coverage UE, such as the IC UEs 512*a*, 512*b*, 522*a* of FIG. 5, or by being an out-of-coverage UE but having a SyncRef UE that is in-coverage, such as the first OOC UE 522*b* of FIG. 5). In such examples, the upper half of the SLIs may be for the remaining devices (e.g., the out-of-coverage UEs having a SyncRef UE that is also out-of-coverage, such as the OOC UEs 522*c*, 522*d* of FIG. 5, or those UEs having no SyncRef UE and autonomously determined their timing instead).

Similarly, if there are N coverage states, the upper N−1 groups may be reserved for the fully out-of-coverage devices, while the remaining lower N−1 groups may be reserved for the not-fully out-of-coverage devices. In some examples, an additional group could be added to the lower and/or the upper N−1 groups to indicate the absence of a SyncRef UE.

In some examples, the partitioning of the SLI into 2*(N−1) groups (or into 2*(N−1)+1 groups, as described above) may be performed based on the space of joint pairs of (SL-PSS, SL-SSS) sequences. For example, if there are two SL-PSS sequences, the SLI groups may be split into two groups (N=1). In another example, if there are four SL-PSS sequences, the SLI groups may be split into four groups (N=2).

In some examples, the receiving UE 604 may determine, at 620, whether to use the receiving timing reference based on the coverage state indicator 614. For example, the receiving UE 604 may receive multiple coverage state indicators 614 and SLSS 616. In some such examples, the receiving UE 604 may determine which coverage state indicator 614 corresponds to the highest coverage state and select the corresponding timing reference. For example, as described above, the coverage state indicators may be sorted from, for example, a fully in-coverage state to a fully out-of-coverage state. In such examples, the fully in-coverage state may be the highest coverage state, the fully out-of-coverage state may be the lowest coverage state, and the interim coverage states may be respectively sorted between the fully in-coverage state and the fully out-of-coverage state.

In some examples, if the coverage state indicator 614 indicates that no fully in-coverage or partially in-coverage devices are available to the receiving UE 604 (e.g., the coverage state indicator 614 corresponds to the lowest coverage state (or fully out-of-coverage state)), the receiving UE 604 may select the timing reference from the SLSS associated with the highest SLI group. For example, as mentioned above, an out-of-coverage device may still select a SyncRef UE that is in-coverage. In such examples, while the out-of-coverage device may be associated with a fully out-of-coverage state, its SLI may be from the lower N−1 SLI groups and, thus, may be prioritized accordingly when selecting the timing reference.

In some examples, when a UE included in a sidelink chain of UEs changes coverage states, the sidelink chain of UEs may determine not to update their configurations. For example, certain groups of coverage states may be prioritized and if a UE changes within that group of coverage states, then the sidelink configurations for the respective UE may not be updated. For example, if an example includes ten coverage states, where the tenth coverage state corresponds to the fully out-of-coverage state and the remaining coverage states correspond to not-fully out-of-coverage states (e.g., the fully in-coverage state and eight partially in-coverage states), then if a UE changes from a second coverage state to a third coverage state, the sidelink configurations may not be updated. However, in some such examples, if the coverage state changes from the tenth coverage state to one of the first nine coverage states (or vice versa), then the UEs may update their sidelink configurations.

Figure 7:
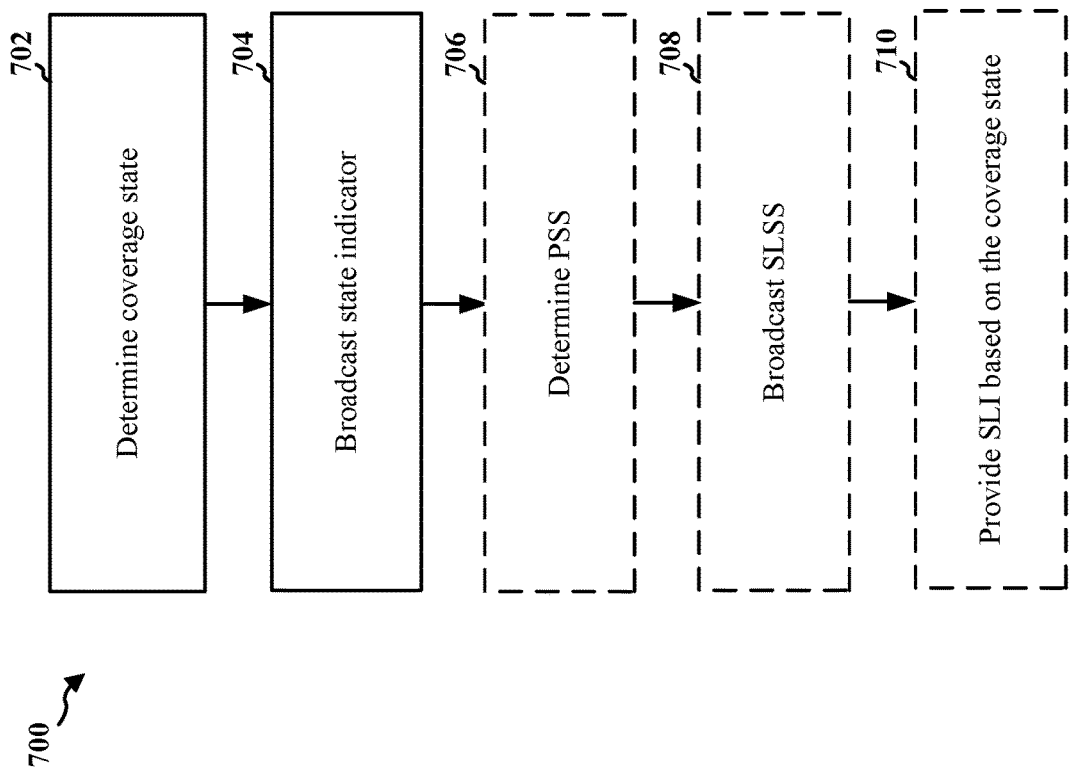
FIGS. 7 to 9 are flowcharts of methods of wireless communication, in accordance with one or more of the teachings disclosed herein.

FIG. 7 is a flowchart 700 of a method of wireless communication. The method may be performed by a wireless device or a component of a wireless device (e.g., the UE 104, 402, 404, 406, 408; the device 310 or 350, the RSU 107, 407, the UEs 512, 522, and/or the broadcasting device 602; the apparatus 1002, which may include memory, a cellular baseband processor 1004, and one or more components configured to perform the method). Optional aspects are illustrated with a dashed line. The method may improve synchronization among wireless devices using sidelink communication.

At 702, the wireless device determines a coverage state with reference to a cell for a timing reference, as described above in connection with 610 of FIG. 6. The timing reference may enable synchronization for communication directly between wireless devices. The timing reference may be for sidelink communication, for example. The coverage state may be determined from among a set of states comprising an in-coverage state, an out-of-coverage state, and an at least one additional coverage state. The additional coverage state may comprise a partial coverage state. The additional state(s) may correspond to the wireless device experiencing weak coverage from the cell, partial coverage from the cell, etc. For example, the wireless device may detect coverage from the cell, but may measure a weak RSRP from the cell or may only receive a few beams from the cell. The determination may be performed, for example, by a coverage state component 1040 of an apparatus 1002 of FIG. 10.

The wireless device may determine the coverage state based on at least a power measurement for at least one of an SS or a CSI-RS received from the cell. For example, the power measurement may comprise an RSRP. For example, the wireless device may determine that the wireless device is in-coverage when the measurement is above a threshold and may determine that the wireless device is in partial coverage when the measurement is below the threshold. In some examples, there may be more than one threshold. For example, the wireless device may determine that the coverage state is a partial coverage state when the measurement is below the threshold for the in-coverage state but above a second threshold for the out-of-coverage state. Additionally, there may be multiple partial coverage states. Thus, there may be a different threshold associated with each of the partial coverage states.

In some examples, the wireless device may determine the coverage state based on at least a number of visible beams for the cell and on which at least one of a SS or a CSI-RS is detected by the wireless device. A visible beam may correspond to a beam for which the wireless device receives an SS having an RSRP that meets a threshold. A visible beam may be a beam for which another measurement meets a threshold. A beam may be determined to be visible based on whether a beam failure is detected for the beam and/or a frequency of such a beam failure for the beam, etc.

In some examples, the wireless device may determine the coverage state based on a beam diversity metric for a set of beams from the cell and on which the SS and/or CSI-RS is detected by the wireless device. The beam diversity metric may identify more than a number of beams detected by the wireless device, and may indicate whether the number of beams are sufficiently different. For example, the diversity metric may be based on a width of the beams, a difference of beam direction for the beams, whether the beams are overlapping, etc. In some examples, the diversity metric may indicate whether the beams have different boresights or peak gain directions. In some examples, the diversity metric may indicate whether the beams are non-overlapping beam main lobes. In order for the wireless device to assess such SSB beam information for a cell, the wireless device may receive beam shape information for base station beams. The wireless device may obtain such SSB beam information from an almanac for the network, from SIB from the base station, and/or in an RRC message from the base station.

In some examples, the wireless device may determine the coverage state based on a number of cells detected by the wireless device and for which the wireless device receives an SS and/or CSI-RS. For example, the coverage state may be determined based on a number of cells that are visible to the wireless device.

At 704, the UE broadcasts a state indicator based on the coverage state determined by the UE, as described above in connection with the coverage state indicator 614 of FIG. 6. The coverage state indication may be transmitted by a transmission component 1034 of the apparatus 1002 of FIG. 10. The coverage state indication may be based on the determined coverage (e.g., at 702). By selecting from a group of coverage states that includes more than an in-coverage state and an out-of-coverage state, the wireless device may be able to convey additional information about the level of coverage experienced by the wireless device. This information may help other wireless devices receiving timing synchronization information from the wireless device to make better decisions about whether to use the timing synchronization information.

In some examples, at 708, the wireless device may broadcast an SLSS associated with the state indicator, as described above in connection with the SLSS 616 of FIG. 6. The SLSS may comprise timing reference information, for example, for sidelink communication. The SLSS may be transmitted by the transmission component 1034 and/or an SLSS component 1042 of the apparatus 1002 of FIG. 10. If the wireless device is in-coverage or in partial coverage of the cell, the timing reference information may be based on the timing reference for the cell. Thus, the wireless device may be synchronized with the cell (e.g., the cell may be the synchronization source for the wireless device). If the wireless device is not in-coverage of a cell, the timing reference information may be based on another synchronization source (e.g., SLSS from another wireless device).

As illustrated at 710, the wireless device may further provide an SLI for the wireless device (e.g., the SLI being associated with the SLSS), as described above in connection with the SLSS 616 of FIG. 6. The SLI may be based on a synchronization reference for the wireless device and the coverage state determined by the wireless device. For example, the wireless device may select an SLI from a first group of SLIs if the wireless device is in-coverage or if the synchronization source is a wireless device that is in-coverage of a cell. The wireless device may select from a second group of SLIs if the wireless device is out-of-coverage and the synchronization reference is from a wireless device that is also out-of-coverage. In an example, a different SLI may be used for a wireless device that is in partial coverage and/or if the synchronization reference is from a wireless device that is in partial coverage. In other examples, there may be two groups of SLI, such as a first group for fully out-of-coverage devices and synchronization references and a second group for devices that are not fully out-of-coverage (e.g., devices that are in-coverage and those in partial coverage or for which the synchronization source was in partial coverage). The SLI may be determined, for example, by an SLI component 1044 of the apparatus 1002 of FIG. 10.

In some examples, at 706, the wireless device may determine a PSS. For example, the wireless device may determine a PSS, SSS pair based on the determined coverage state of the of the wireless device (e.g., at 702). A first PSS may be associated with the out-of-coverage state, and a second PSS may be associated with the at least one additional coverage state. Therefore, another wireless device receiving timing reference information from the wireless device may determine the coverage state of the wireless device based on the PSS and/or the PSS, SSS pair associated with the timing reference information. The PSS and/or PSS, SSS pair may be determined by a PSS component 1046 of the apparatus 1002 of FIG. 10.

Figure 8:
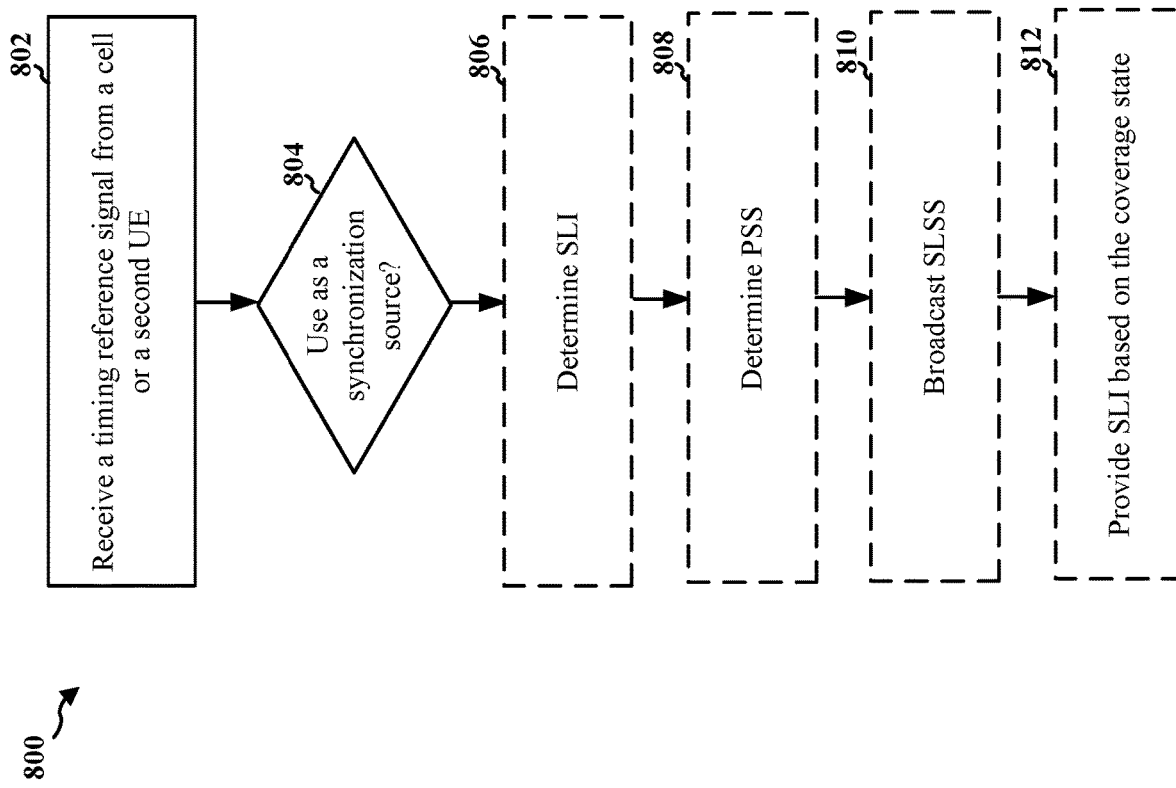

FIG. 8 is a flowchart 800 of a method of wireless communication. The method may be performed by a wireless device or a component of a wireless device (e.g., the UE 104, 402, 404, 406, 408; the device 310 or 350, the RSU 107, 407, the UEs 512, 522, and/or the receiving device 604; the apparatus 1002, which may include memory, a cellular baseband processor 1004, and one or more components configured to perform the method). Optional aspects are illustrated with a dashed line. The method may improve synchronization among wireless devices using sidelink communication.

At 802, the wireless device receives a timing reference signal from a cell or a second UE, as described above in connection with the SLSS 616 of FIG. 6 and 618 of FIG. 6. For example, the wireless device may receive synchronization signals from a cell or may receive an SLSS from a second wireless device (e.g., the broadcasting UE 602 of FIG. 6). If the wireless device receives an SLSS from the second wireless device, the timing reference signal may include a coverage state associated with the second wireless device. The coverage state may selected from among a set of states comprising an in-coverage state, an out-of-coverage state, and at least one additional coverage state. The timing reference signal may be received, for example, by a reception component 1030 of the apparatus 1002 of FIG. 10. The at least one additional coverage state may comprise at least one partial coverage state (e.g., as described above in connection with 702 in FIG. 7). The timing reference may facilitate sidelink communication.

At 804, the wireless device determines whether to use the timing reference signal from the cell or the second wireless device as a synchronization source, as described above in connection with 620 of FIG. 6. The determination may be based on whether the coverage state associated with the timing reference signal from the second wireless device is the in-coverage state, the out-of-coverage state, or the at least one additional coverage state. The determination may be performed, for example, by a determination component 1048 of apparatus the 1002 of FIG. 10.

Figure 9:
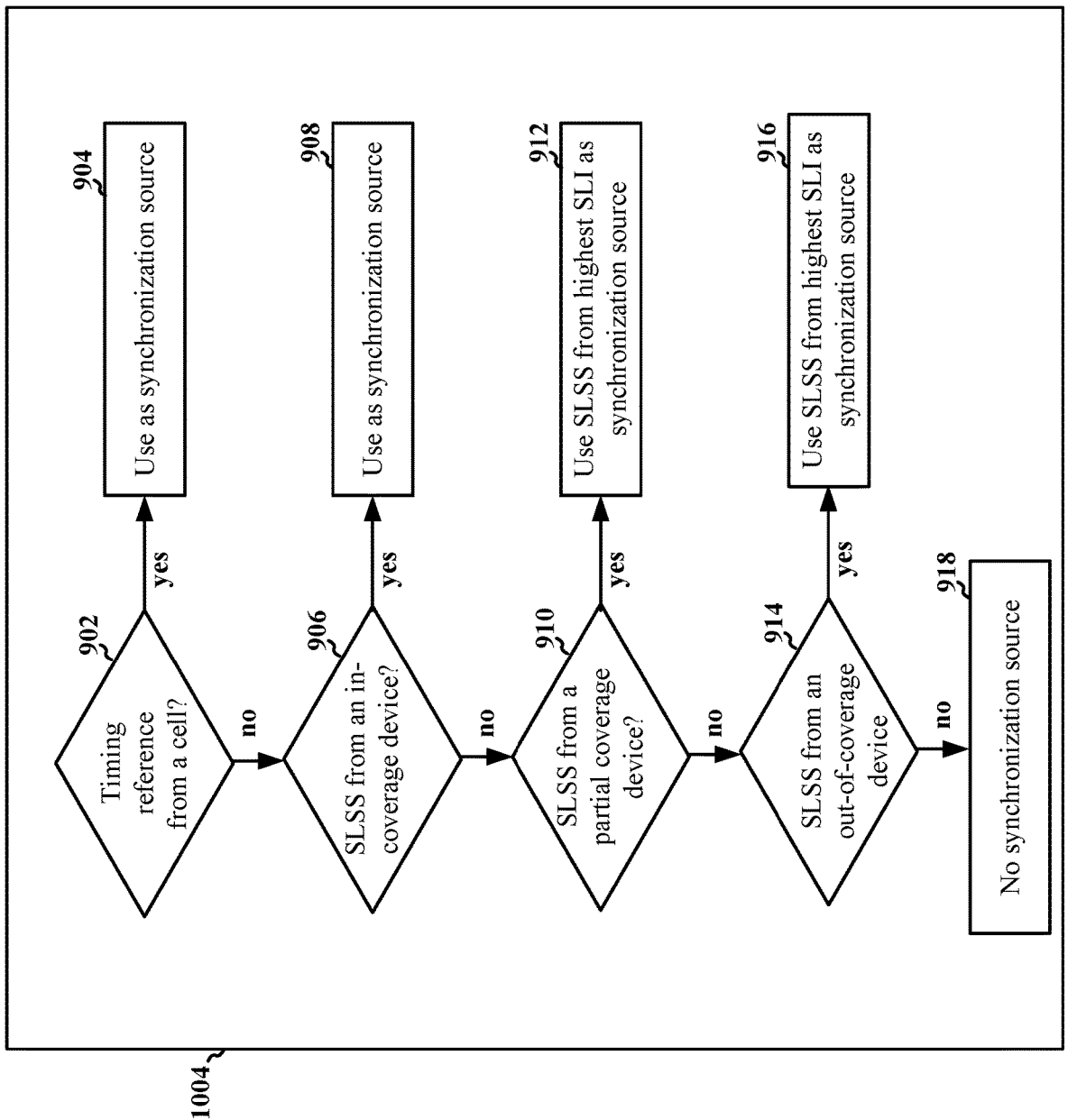

FIG. 9 illustrates example aspects that the wireless device may apply in determining whether to use the timing reference signal. For example, the wireless device may determine, at 902, whether the timing reference information is received from a cell. If the information is from a cell, the wireless device may determine to use the timing reference signal as a synchronization source, at 904. If not, the wireless device may proceed to 906. At 906, the wireless device may determine whether the timing reference information is from an in-coverage device. If the information is from an in-coverage device, the wireless device may determine to use the timing reference signal as a synchronization source, at 908. If not, the wireless device may proceed to 910. The wireless device may prioritize timing reference information received from wireless devices having the at least one additional coverage state over the out-of-coverage state when determining whether to use the timing reference signal from the second wireless device as the synchronization source for the wireless device. Thus, at 910, the wireless device may determine whether the timing reference signal is received from a device in partial coverage. If so, the wireless device may use a timing reference signal having a highest SLI as a synchronization source, at 912. If not, the wireless device may proceed to 914 to consider whether the timing reference signal is from an out-of-coverage device. If so, the wireless device may prioritize a timing reference signal having an SLI associated with a highest coverage indicator as a part of determining whether to use the timing reference signal from the second wireless device as the synchronization source for the wireless device, at 916. The highest SLI may corresponds to an SLI indicating a highest level of coverage from among the possible coverage states. Otherwise, the wireless device determines, at 918, to proceed without a synchronization source (e.g., without a received SLSS).

In some examples, at 810, and similar to the method described in connection with FIG. 7, the wireless device may use the timing reference signal to broadcast an SLSS with an associated coverage state indicator for the wireless device, as described above in connection with the SLSS 622 of FIG. 6. The SLSS may be based on the timing reference signal received from the second wireless device. The SLSS may be generated and transmitted by the SLSS component 1042 and/or the transmission component 1034 of the apparatus 1002 of FIG. 10.

In some examples, at 806, the wireless device may determine an SLI associated with the SLSS to be broadcasted by the wireless device, as described above in connection with 622 of FIG. 6. As illustrated at 812, the wireless device may further provide an SLI for the wireless device (e.g., the SLI being associated with the SLSS), as described above in connection with the SLSS 624 of FIG. 6. The SLI may be based on a synchronization reference for the wireless device and the coverage state determined by the wireless device. For example, the wireless device may select an SLI from a first group of SLIs if the wireless device is in-coverage or if the synchronization source is a wireless device that is in-coverage of a cell. The wireless device may select from a second group of SLIs if the wireless device is out-of-coverage and the synchronization reference is from a wireless device that is also out-of-coverage. In an example, a different SLI may be used for a wireless device that is in partial coverage and/or if the synchronization reference is from a wireless device that is in partial coverage.

In other examples, there may be two groups of SLI, such as a first group for fully out-of-coverage devices and synchronization references and a second group for devices that are not fully out-of-coverage (e.g., devices that are in-coverage and those in partial coverage or for which the synchronization source was in partial coverage). The SLI may be determined and/or provided, for example, by the SLI component 1044 and/or the transmission component 1034 of the apparatus 1002 of FIG. 10.

At 808, the wireless device may determine a PSS, as described above in connection with 622 of FIG. 6. For example, the wireless device may determine a PSS, SSS pair based on the coverage state of the of the wireless device. A first PSS may be associated with the out-of-coverage state, and a second PSS may be associated with the at least one additional coverage state. Therefore, another wireless device receiving timing reference information from the wireless device may determine the coverage state of the wireless device based on the PSS and/or the PSS, SSS pair associated with the timing reference information. The PSS and/or PSS, SSS pair may be determined by the PSS component 1046 of the apparatus 1002 of FIG. 10.

Figure 10:
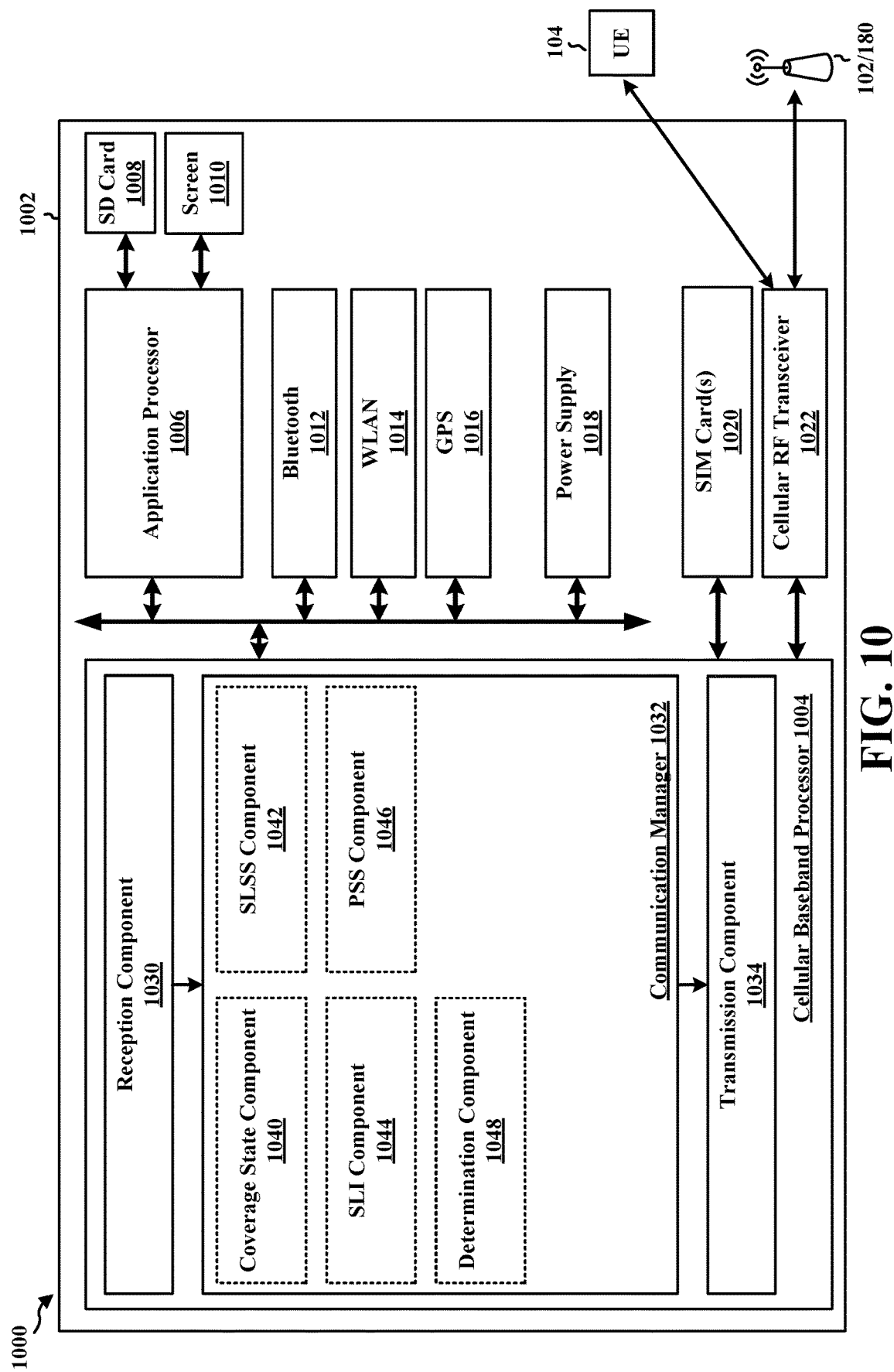
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE or other wireless device that communicates based on sidelink. The apparatus 1002 includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with other wireless devices, such as a UE 104 and/or BS 102/180. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the device 310 or 350 and may include the memory 360 or 370 and/or at least one of the TX processor 316 or 368, the RX processor 356 or 370, and the controller/processor 359 or 375. In one configuration, the apparatus 1002 may be a modem chip and include just the baseband processor 1004, and in another configuration, the apparatus 1002 may be the entire wireless device (e.g., see the device 310 or 350 of FIG. 3) and include the additional modules of the apparatus 1002.

The communication manager 1032 includes a coverage state component 1044, an SLSS component 1042, an SLI component 1044, a PSS component 1046, and/or a determination component 1048 component 1040 configured to perform the aspects described in connection with methods in FIGS. 8, 9, and/or 10. The apparatus is illustrated as including components to perform the method of FIGS. 8, 9, and/or 10, because the wireless device may operate as a broadcasting device at times and may operate as a receiving device at other times. In other examples, the apparatus 1002 may include components for the method of FIG. 8 without including components configured to perform the methods of FIGS. 9 and/or 10, may include components for the method of FIG. 9 without including components configured to perform the methods of FIGS. 8 and/or 10, or may include components for the method of FIG. 10 without including components configured to perform the methods of FIGS. 8 and/or 9.

The apparatus may include additional components that perform each of the blocks of the algorithm in the aforementioned flowcharts of FIGS. 8, 9, and/or 10. As such, each block in the aforementioned flowcharts of FIGS. 8, 9, and/or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for determining a coverage state with reference to a cell for a timing reference, and where the coverage state is determined from among a set of states comprising an in coverage state, an out of coverage state, and an at least one additional coverage state. The apparatus 1002 may include means for broadcasting a state indicator based on the coverage state determined by the wireless device. The apparatus 1002 may include means for broadcasting an SLSS associated with the state indicator and comprising timing reference information. The apparatus 1002 may include means for providing an SLI for the wireless device, and where the SLI is based on a synchronization reference for the wireless device and the coverage state determined by the wireless device. The apparatus 1002 may include means for determining a PSS based on the coverage state of the wireless device. The apparatus 1002 may include means for determining a PSS, SSS pair based on the coverage state of the wireless device.

In an additional or alternate configuration, the apparatus 1002, and in particular the cellular baseband processor 1004, includes means for receiving a timing reference signal from a second wireless device, the timing reference signal having an associated coverage state for the second wireless device, and where the coverage state is selected from among a set of states comprising an in coverage state, an out of coverage state, and an at least one additional coverage state. The apparatus 1002 may include means for determining whether to use the timing reference signal from the second wireless device as a synchronization source for the first wireless device, and where the determination is based on whether the coverage state associated with the timing reference signal from the second wireless device is the in coverage state, the out of coverage state, of the at least one additional coverage state. The apparatus 1002 may include means for broadcasting an SLSS with an associated coverage state indicator for the first wireless device, the SLSS being based on the timing reference signal received from the second wireless device. The apparatus 1002 may include means for providing an SLI for the first wireless device and associated with the SLSS, and where the SLI is based on a received SLI from the second wireless device and the associated coverage state for the first wireless device. The apparatus 1002 may include means for determining a PSS based on a coverage state for the first wireless device. The apparatus 1002 may include means for determining a PSS, SSS pair based on the coverage state of the first wireless device.

The aforementioned means may be one or more of the aforementioned components of the apparatus 1002 configured to perform the functions recited by the aforementioned means. As described supra, the apparatus 1002 may include the TX Processor 316 or 368, the RX Processor 356 or 370, and the controller/processor 359 or 375. As such, in one configuration, the aforementioned means may be the TX Processor 316 or 368, the RX Processor 356 or 370, and the controller/processor 359 or 375 configured to perform the functions recited by the aforementioned means.

The following examples are illustrative only and may be combined with aspects of other embodiments or teachings described herein, without limitation.

Example 1 is a method of wireless communication at a wireless device, comprising: determining a coverage state with reference to a cell for a timing reference for sidelink communication, wherein the coverage state is determined from among a set of states comprising an in-coverage state, an out-of-coverage state, and at least one additional coverage state; and broadcasting a state indicator based on the coverage state determined by the wireless device.

In Example 2, the method of Example 1 further includes that the at least one additional coverage state comprises at least one partial coverage state.

In Example 3, the method of any of Example 1 or Example 2 further includes: broadcasting a sidelink synchronization signal (SLSS) associated with the state indicator, the SLSS comprising timing reference information; and providing a sidelink identity (SLI) for the wireless device, wherein the SLI is based on a synchronization reference for the wireless device and the coverage state determined by the wireless device.

In Example 4, the method of any of Examples 1 to 3 further includes that the wireless device determines the coverage state based on at least a power measurement for at least one of a synchronization signal (SS) or a channel state information reference signal (CSI-RS) received from the cell.

In Example 5, the method of any of Examples 1 to 4 further includes that the wireless device determines the coverage state based on at least a number of visible beams for the cell and on which at least one of a synchronization signal (SS) or a channel state information reference signal (CSI-RS) is detected by the wireless device.

In Example 6, the method of any of Examples 1 to 5 further includes that the wireless device determines the coverage state based on at least a beam diversity metric for a set of beams from the cell and on which at least one of a synchronization signal (SS) or a channel state information reference signal (CSI-RS) is detected by the wireless device.

In Example 7, the method of any of Examples 1 to 6 further includes that the beam diversity metric is based on at least one of beam width, beam direction, or whether beams are overlapping.

In Example 8, the method of any of Examples 1 to 7 further includes that the wireless device determines the coverage state based on at least a number of cells detected by the wireless device and for which the wireless device receives at least one of a synchronization signal (SS) or a channel state information reference signal (CSI-RS).

In Example 9, the method of any of Examples 1 to 8 further includes determining a primary synchronization signal (PSS), secondary synchronization signal (SSS) pair based on the coverage state of the wireless device.

In Example 10, the method of any of Examples 1 to 9 further includes that a first PSS is associated with the in-coverage state, a second PSS is associated with the out-of-coverage state, and a third PSS is associated with the at least one additional coverage state.

Example 11 is a device including one or more processors and one or more memories in electronic communication with the one or more processors storing instructions executable by the one or more processors to cause a system or an apparatus to implement a method as in any of Examples 1 to 10.

Example 12 is a system or apparatus including means for implementing a method or realizing an apparatus as in any of Examples 1 to 10.

Example 13 is a non-transitory computer-readable medium storing instructions executable by one or more processors to cause the one or more processors to implement a method as in any of Examples 1 to 10.

Example 14 is a method of wireless communication at a first wireless device, comprising: receiving a timing reference signal for sidelink communication from a second wireless device, the timing reference signal having a state indicator indicating a coverage state for the second wireless device, wherein the coverage state is selected from among a set of states comprising an in-coverage state, an out-of-coverage state, and at least one additional coverage state; and determining whether to use the timing reference signal from the second wireless device as a synchronization source for the first wireless device, wherein the determination is based on whether the coverage state associated with the timing reference signal from the second wireless device is the in-coverage state, the out-of-coverage state, or the at least one additional coverage state.

In Example 15, the method of Example 14 further includes that the first wireless device prioritizes timing reference information received from wireless devices having the at least one additional coverage state over the out-of-coverage state when determining whether to use the timing reference signal from the second wireless device as the synchronization source for the first wireless device.

In Example 16, the method of any of Example 14 or Example 15 further includes that when the first wireless device receives timing reference information having the state indicator indicating the out-of-coverage state, the first wireless device prioritizes a sidelink identity (SLI) associated with a highest coverage indicator as a part of determining whether to use the timing reference signal from the second wireless device as the synchronization source for the first wireless device.

In Example 17, the method of any of Examples 14 to 16 further includes broadcasting a sidelink synchronization signal (SLSS) with an associated state indicator for the first wireless device, the SLSS being based on the timing reference signal received from the second wireless device.

In Example 18, the method of any of Examples 14 to 17 further includes providing a sidelink identity (SLI) for the first wireless device and associated with the SLSS, wherein the SLI is based on a received SLI from the second wireless device and the associated coverage state for the first wireless device.

Example 19 is a device including one or more processors and one or more memories in electronic communication with the one or more processors storing instructions executable by the one or more processors to cause a system or an apparatus to implement a method as in any of Examples 14 to 18.

Example 20 is a system or apparatus including means for implementing a method or realizing an apparatus as in any of Examples 14 to 18.

Example 21 is a non-transitory computer-readable medium storing instructions executable by one or more processors to cause the one or more processors to implement a method as in any of Examples 14 to 18.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless device, comprising:
    determining a coverage state of the wireless device with reference to a cell for a timing reference for sidelink communication, wherein the coverage state is determined from among a set of states comprising an in-coverage state, an out-of-coverage state, and at least one additional coverage state;
    broadcasting a state indicator based on the determined coverage state of the wireless device;
    determining a first coverage state associated with a synchronization reference for the wireless device, wherein the first coverage state is determined from among a first set of states comprising at least a first in-coverage state and a first out-of-coverage state; and
    providing a sidelink identity (SLI) for the wireless device, wherein the SLI is based on the determined first coverage state associated with the synchronization reference for the wireless device and the determined coverage state of the wireless device.

2. The method of claim 1, wherein the at least one additional coverage state comprises at least one partial coverage state.

3. The method of claim 1, further comprising:
    broadcasting a sidelink synchronization signal (SLSS) associated with the state indicator, the SLSS comprising timing reference information.

4. The method of claim 1, wherein the wireless device determines the coverage state based on at least a power measurement for at least one of a synchronization signal (SS) or a channel state information reference signal (CSI-RS) received from the cell.

5. The method of claim 1, wherein the wireless device determines the coverage state based on at least a number of visible beams for the cell and on which at least one of a synchronization signal (SS) or a channel state information reference signal (CSI-RS) is detected by the wireless device.

6. The method of claim 1, wherein the wireless device determines the coverage state based on at least a beam diversity metric for a set of beams from the cell and on which at least one of a synchronization signal (SS) or a channel state information reference signal (CSI-RS) is detected by the wireless device.

7. The method of claim 6, wherein the beam diversity metric is based on at least one of beam width, beam direction, or whether beams are overlapping.

8. The method of claim 1, wherein the wireless device determines the coverage state based on at least a number of cells detected by the wireless device and for which the wireless device receives at least one of a synchronization signal (SS) or a channel state information reference signal (CSI-RS).

9. The method of claim 1, further comprising determining a primary synchronization signal (PSS), secondary synchronization signal (SSS) pair based on the coverage state of the wireless device.

10. The method of claim 9, wherein a first PSS is associated with the in-coverage state, a second PSS is associated with the out-of-coverage state, and a third PSS is associated with the at least one additional coverage state.

11. An apparatus for wireless communication at a wireless device, comprising:
a memory; and
at least one processor coupled to the memory and configured to:
determine a coverage state of the wireless device with reference to a cell for a timing reference, wherein the coverage state is determined from among a set of states comprising an in-coverage state, an out-of-coverage state, and at least one additional coverage state;
broadcast a state indicator based on the determined coverage state of the wireless device;
determine a first coverage state associated with a synchronization reference for the wireless device, wherein the first coverage state is determined from among a first set of states comprising at least a first in-coverage state and a first out-of-coverage state; and
provide a sidelink identity (SLI) for the wireless device, wherein the SLI is based on the determined first coverage state associated with the synchronization reference for the wireless device and the determined coverage state of the wireless device.

12. The apparatus of claim 11, wherein the at least one processor is further configured to:
broadcast a sidelink synchronization signal (SLSS) associated with the state indicator, the SLSS comprising timing reference information.

13. The apparatus of claim 11, wherein the at least one processor is configured to determine the coverage state based on at least a power measurement for at least one of a synchronization signal (SS) or a channel state information reference signal (CSI-RS) received from the cell.

14. The apparatus of claim 11, wherein the at least one processor is configured to determine the coverage state based on at least a number of visible beams for the cell and on which at least one of a synchronization signal (SS) or a channel state information reference signal (CSI-RS) is detected by the wireless device.

15. The apparatus of claim 11, wherein the at least one processor is configured to determine the coverage state based on at least a beam diversity metric for a set of beams from the cell and on which at least one of a synchronization signal (SS) or a channel state information reference signal (CSI-RS) is detected by the wireless device.

16. The apparatus of claim 11, wherein the at least one processor is configured to determine the coverage state based on at least a number of cells detected by the wireless device and for which the wireless device receives at least one of a synchronization signal (SS) or a channel state information reference signal (CSI-RS).

17. The apparatus of claim 11, wherein the at least one processor is further configured to determine a primary synchronization signal (PSS), secondary synchronization signal (SSS) pair based on the coverage state of the wireless device.

18. The apparatus of claim 17, wherein a first PSS is associated with the in-coverage state, a second PSS is associated with the out-of-coverage state, and a third PSS is associated with the at least one additional coverage state.

19. A method of wireless communication at a first wireless device, comprising:
receiving a timing reference signal for sidelink communication from a second wireless device, the timing reference signal having a state indicator and a first sidelink identity (SLI), the state indicator indicating a coverage state for the second wireless device, the first SLI being based on a first coverage state associated with a synchronization reference for the second wireless device, wherein the coverage state is selected from among a set of states comprising an in-coverage state, an out-of-coverage state, and at least one additional coverage state, and the first coverage state is selected from among a first set of states comprising at least a first in-coverage state and a first out-of-coverage state; and
determining whether to use the timing reference signal from the second wireless device as a synchronization source for the first wireless device, wherein the determination is based on the first SLI and whether the coverage state associated with the timing reference signal from the second wireless device is the in-coverage state, the out-of-coverage state, or the at least one additional coverage state.

20. The method of claim 19, wherein the first wireless device prioritizes timing reference information received from wireless devices having the at least one additional coverage state over the out-of-coverage state when determining whether to use the timing reference signal from the second wireless device as the synchronization source for the first wireless device.

21. The method of claim 19, wherein when the first wireless device receives timing reference information having the state indicator indicating the out-of-coverage state, the first wireless device prioritizes an SLI associated with a highest coverage indicator as a part of determining whether to use the timing reference signal from the second wireless device as the synchronization source for the first wireless device.

22. The method of claim 19, further comprising broadcasting a sidelink synchronization signal (SLSS) with an associated state indicator for the first wireless device, the SLSS being based on the timing reference signal received from the second wireless device.

23. The method of claim 22, further comprising providing an SLI for the first wireless device and associated with the SLSS, wherein the SLI is based on the first SLI from the second wireless device and the associated coverage state for the first wireless device.

24. An apparatus for wireless communication at a first wireless device, comprising:
- a memory; and
- at least one processor coupled to the memory and configured to:
  - receive a timing reference signal for sidelink communication from a second wireless device, the timing reference signal having a state indicator and a first sidelink identity (SLI), the state indicator indicating a coverage state for the second wireless device, the first SLI being based on a first coverage state associated with a synchronization reference for the second wireless device, wherein the coverage state is selected from among a set of states comprising an in-coverage state, an out-of-coverage state, and at least one additional coverage state, and the first coverage state is selected from among a first set of states comprising at least a first in-coverage state and a first out-of-coverage state; and
  - determine whether to use the timing reference signal from the second wireless device as a synchronization source for the first wireless device, wherein the determination is based on the first SLI and whether the coverage state associated with the timing reference signal from the second wireless device is the in-coverage state, the out-of-coverage state, or the at least one additional coverage state.

25. The apparatus of claim 24, wherein the at least one additional coverage state comprises at least one partial coverage state.

26. The apparatus of claim 24, wherein the at least one processor is further configured to prioritize timing reference information received from wireless devices having the at least one additional coverage state over the out-of-coverage state when determining whether to use the timing reference signal from the second wireless device as the synchronization source for the first wireless device.

27. The apparatus of claim 24, wherein the at least one processor is configured to prioritize an SLI associated with a highest coverage indicator as a part of determining whether to use the timing reference signal from the second wireless device as the synchronization source for the first wireless device when the first wireless device receives timing reference information having the state indicator indicating the out-of-coverage state.

28. The apparatus of claim 24, wherein the at least one processor is further configured to:
- broadcast a sidelink synchronization signal (SLSS) with an associated state indicator for the first wireless device, the SLSS being based on the timing reference signal received from the second wireless device.

29. The apparatus of claim 28, wherein the at least one processor is further configured to:
- provide an SLI for the first wireless device and associated with the SLSS, wherein the SLI is based on the first SLI from the second wireless device and the associated coverage state for the first wireless device.

* * * * *